(12) United States Patent
Choi et al.

(10) Patent No.: US 9,621,810 B2
(45) Date of Patent: Apr. 11, 2017

(54) METHOD AND APPARATUS FOR DISPLAYING IMAGE

(71) Applicant: Samsung Electronics Co., Ltd., Suwon-si, Gyeonggi-do (KR)

(72) Inventors: Hong-Suk Choi, Suwon-si (KR); Moon-Soo Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 45 days.

(21) Appl. No.: 14/631,053

(22) Filed: Feb. 25, 2015

(65) Prior Publication Data

US 2015/0242982 A1    Aug. 27, 2015

(30) Foreign Application Priority Data

Feb. 25, 2014 (KR) .................. 10-2014-0022149

(51) Int. Cl.
| | |
|---|---|
| *G06K 9/00* | (2006.01) |
| *H04N 5/232* | (2006.01) |
| *G06F 3/048* | (2013.01) |
| *H04M 1/725* | (2006.01) |
| *H04N 5/222* | (2006.01) |
| *H04N 5/369* | (2011.01) |
| *G06T 11/00* | (2006.01) |

(52) U.S. Cl.
CPC ......... *H04N 5/23293* (2013.01); *G06F 3/048* (2013.01); *G06T 11/00* (2013.01); *H04M 1/72522* (2013.01); *H04N 5/2226* (2013.01); *H04N 5/23212* (2013.01); *H04N 5/23216* (2013.01); *H04N 5/3696* (2013.01); *H04M 2250/52* (2013.01)

(58) Field of Classification Search
CPC .. G06F 3/048; H04N 5/2226; H04N 5/23293; H04N 9/077; G06T 1/0007; G06T 2207/10004; H04M 1/72522; H04M 2250/52

See application file for complete search history.

(56) References Cited

U.S. PATENT DOCUMENTS

| | | | |
|---|---|---|---|
| 8,149,324 B2* | 4/2012 | Oikawa .............. | H04N 5/23212 250/231.16 |
| 2006/0290932 A1* | 12/2006 | Kawanami .............. | G02B 7/34 356/370 |
| 2012/0007942 A1 | 1/2012 | Michrowski et al. | |
| 2012/0019703 A1* | 1/2012 | Thorn ..................... | G06T 5/002 348/333.03 |
| 2012/0056989 A1* | 3/2012 | Izumi .................. | H04N 13/0014 348/46 |
| 2013/0070145 A1* | 3/2013 | Matsuyama ....... | H04N 5/23216 348/333.12 |
| 2013/0222633 A1* | 8/2013 | Knight .............. | H04N 5/23293 348/222.1 |

(Continued)

*Primary Examiner* — Bhavesh Mehta
*Assistant Examiner* — Ian Lemieux
(74) *Attorney, Agent, or Firm* — Jefferson IP Law, LLP

(57) ABSTRACT

A method of operating an electronic device is provided. The method includes acquiring an image including one or more objects, detecting distances between the one or more objects and the electronic device, determining a display methods to display information related to the one or more objects based on the distances, and displaying the information related to the one or more objects based on the determined display method.

14 Claims, 18 Drawing Sheets

(56) References Cited

U.S. PATENT DOCUMENTS

| | | | | |
|---|---|---|---|---|
| 2014/0219576 A1* | 8/2014 | Yokoyama | ............... | G06T 5/003 |
| | | | | 382/255 |
| 2015/0010236 A1* | 1/2015 | Chang | ..................... | G06T 5/003 |
| | | | | 382/195 |
| 2015/0116353 A1* | 4/2015 | Miura | ..................... | G06T 11/60 |
| | | | | 345/632 |
| 2016/0127636 A1* | 5/2016 | Ito | ....................... | G06F 3/04845 |
| | | | | 348/333.12 |

* cited by examiner

METHOD AND APPARATUS FOR DISPLAYING IMAGE

CROSS-REFERENCE TO RELATED APPLICATION(S)

This application claims the benefit under 35 U.S.C. §119(a) of a Korean patent application filed on Feb. 25, 2014 in the Korean Intellectual Property Office and assigned Serial number 10-2014-0022149, the entire disclosure of which is hereby incorporated by reference.

TECHNICAL FIELD

The present disclosure relates to a method and an apparatus for displaying an image.

BACKGROUND

According to the development of information communication technologies and semiconductor technologies, various electronic devices have been developed as multimedia devices that provide various multimedia services. For example, electronic devices provide various multimedia services, such as a messenger service, a broadcasting service, a wireless Internet service, a camera service, and a music reproduction service. The electronic devices include a high pixel camera module, and thus can photograph still images and dynamic images and can acquire pictures or capture images to which various photography effects are applied.

When a picture is taken using an electronic device, an auto focus (AF) function, which adjusts an optimal lens focal length against an object, has been recently used. Further, the electronic device provides a touch auto focus (TAF) service by which a user adjusts focusing by directly touching an object in a preview image. In this case, the electronic device informs the user of a focused object by displaying additional information, such as a focusing symbol around the focused object in the preview.

The above information is presented as background information only to assist with an understanding of the present disclosure. No determination has been made, and no assertion is made, as to whether any of the above might be applicable as prior art with regard to the present disclosure.

SUMMARY

An electronic device equally displays all pieces of additional information of objects such as focusing symbols in a preview, which causes a user to have difficulty in predicting the distance from each object displayed in the preview. Aspects of the present disclosure are to address at least the above-mentioned problems and/or disadvantages and to provide at least the advantages described below. Accordingly, an aspect of the present disclosure is to provide an image displaying method and apparatus for displaying distances from objects by using additional information displayed in the preview.

Another aspect of the present disclosure is to provide an image displaying method and apparatus for differently displaying information related to objects according to distances from a plurality of objects.

Another aspect of the present disclosure is to provide an image displaying method and apparatus for displaying additional information of each of a plurality of objects included in an image based on a distance from each of a plurality of objects.

In accordance with an aspect of the present disclosure, a method of operating an electronic device is provided. The method includes acquiring an image including one or more objects, detecting distances between the one or more objects and the electronic device, determining a display method to display information related to the one or more objects based on the distances, and displaying the information related to the one or more objects according to the determined display method.

In accordance with another aspect of the present disclosure, an apparatus is provided. The apparatus includes as image sensor and a processor configured to acquire an image including one or more objects from the image sensor, detect distances from the one or more objects, determine a display method to display information related to the one or more objects based on the distances, and displaying the information related to the one or more objects according to the display methods.

An image displaying method and apparatus according to various embodiments of the present disclosure can differently display information respectively related to one or more objects according to respective distances from the objects. An image displaying method and apparatus according to various embodiments of the present disclosure can intuitively display distances from a plurality of objects. An image displaying method and apparatus according to various embodiments of the present disclosure can provide various visual effects based on distance information of objects.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to the present disclosure may include one or more among a smart phone, a tablet personal computer (PC), a mobile phone, a video phone, an electronic book reader, a desktop PC, a laptop PC, a netbook computer, a personal digital assistant (PDA), a portable media player (PMP), an Motion Picture Experts Group (MPEG) audio layer 3 (MP3) player, an accessory, an appcessory, a camera, a wearable device, a wrist watch, a refrigerator, an air conditioner, a cleaning machine, an artificial intelligence robot, a television (TV), a digital versatile disc (DVD) player, an audio device, an oven, a microwave oven, a washing machine, an electronic wristlet, an electronic necklace, an air cleaner, an electronic frame, a medical device, a navigation device, a satellite signal receiver, an event data recorder (EDR), a flight data recorder (FDR), a set-top box, a TV box, an electronic dictionary, an automobile infotainment, an electronic device for a ship, an aero electronic device, a security device, electronic clothes, an electronic key, a camcorder, a game console, a head mounted display (HMD), a flat display device, an electronic album, a part of furniture or building/structure including an electronic device, an electronic board, an electronic sign input device, and a projector. Further, it is obvious to those skilled in the art that the electronic device according to the present disclosure is not limited to the aforementioned devices.

Figure 1:
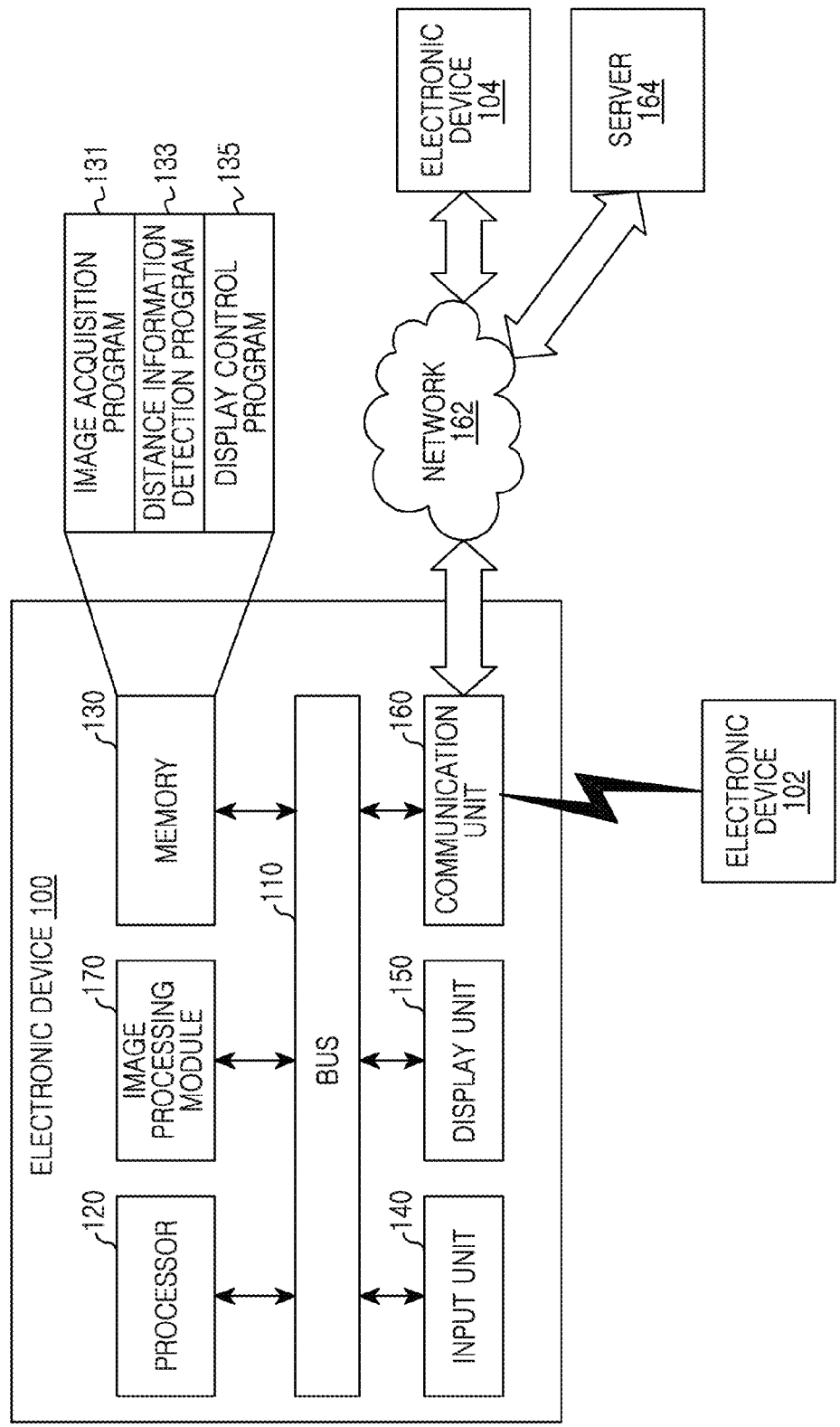
FIG. 1 is a block diagram of an electronic device according to an embodiment of the present disclosure.

FIG. 1 is a block diagram of an electronic device according to an embodiment of the present disclosure.

Referring to FIG. 1, an electronic device 100 may include a bus 110, a processor 120, a memory 130, an input unit 140, a display unit 150, a communication unit 160, and an image processing module 170. The bus 110 may connect the components included in the electronic device 100, for example, the processor 120, the memory 130, the input unit 140, the display unit 150, the communication unit 160, and the image processing module 170, and may control communication between the components.

The processor 120 may receive commands from the components included in the electronic device 100 through the bus 110, analyze the received commands, and perform calculations or data processing according to the analyzed commands. At this time, the processor 120 may execute one or more programs stored in the memory 130 to control and/or provide services corresponding to the one or more programs. According to an embodiment of the present disclosure, the processor 120 may execute an image acquisition program 131, a distance information detection program 133, and a display control program 135 to acquire a first image from an image sensor, such as the image processing module 170, detect a distance between each of a plurality of objects included in the first image and the electronic device 100, determine a method of displaying information or additional information related to each of the objects based on the detected distance between each of the objects and the electronic device 100, and display the information related to each of the objects together with the first image according to the determined displaying method.

According to an embodiment of the present disclosure, the processor 120 may include one or more application processors (APs) (not shown) or one or more communication processors (CPs) (not shown). For example, the APs and the CPs may be included in the processor 120 or may be included in different integrated circuit (IC) packages, respectively. Further, the APs and the CPs may be included in one IC package. The AP may control a plurality of hardware or software components connected to the AP by driving an operating system or an application program and perform processing of various pieces of data, including multimedia data and calculations. The AP may be implemented by a system on chip (SoC). The CP may perform at least some of the multimedia control functions. Further, the CP may distinguish between and authenticate terminals within a communication network by using a subscriber identification module (SIM), for example, a SIM card. For example, the CP may provide a user with a service including a voice call, video call, text message, or packet data. In addition, the CP may control data transmission/reception of the communication unit 160.

The AP or the CP may load commands or data received from a non-volatile memory, for example, the memory 130, or at least one of other components connected to each of the AP and the CP in a volatile memory, and may process the loaded commands or data. The AP or the CP may store data received from or generated by at least one of other components in a non-volatile memory. The CP may manage a data link in communication between an electronic device, such as the electronic device 100, including hardware and another electronic device, such as electronic devices 102 and 104, connected to the electronic device 100 through a network 162, and may perform a function of switching a communication protocol. The CP may be implemented by the SoC.

The processor 120 may include one or more data processor, image processor, and codec. Furthermore, the electronic device 100 may include a separate data processor, image processor, or codec. According to an embodiment of the present disclosure, the processor 120 may further include a graphics processing unit (GPU).

The memory 130 may store commands or data received from or generated by one or more components, for example, the processor 120, the input unit 140, the display unit 150, the communication unit 160, or the image processing module 170, included in the electronic device 100. The memory 130 may store one or more programs for services of the electronic device 100. For example, the memory 130 may include the image acquisition program 131, the distance information detection program 133, and the display control program 135. At this time, each of the programs may include a programming module, and each programming module may include software, firmware, hardware, or a combination of two or more thereof.

The image acquisition program 131 may include at least one software component for acquiring a first image from an image sensor (not shown), which may be included in the electronic device 100. The first image may be displayed as a preview image or may be stored in the memory 130 of the electronic device 100.

The distance information detection program 133 may include at least one software component for detecting a distance between each of a plurality of objects included in the acquired first image and the electronic device 100. At this time, the distance information program 133 may identify the distance between each of the plurality of objects included in the first image and the electronic device by using a plurality of phase difference detection pixels included in the image sensor.

The display control program 135 may include at least one software component for determining a method of displaying additional information on each of the objects based on the detected distance between each of the plurality of objects and the electronic device 100. At this time, the display control program 135 may determine the method of displaying the additional information on each of the objects relatively or absolutely based on the distance between each of the plurality of objects and the electronic device 100. For example, when an object is farther from the electronic device, the display control program 135 may display additional information of the object to be gradually smaller. In another example, when an object is farther from the electronic device, the display control program 135 may display additional information of the object to be gradually paler. In still another example, when an object is farther from the electronic device, the display control program 135 may display additional information of the object in a simple form. The additional information may include a focusing symbol displayed when an object is touched, information related to an object, or all pieces of information which can be inserted into or displayed in a preview. The focusing symbol may include various forms, for example, "{ }", "[ ]", "( )", and "< >", but is not limited thereto and may be any suitable and/or similar symbol and/or graphical representation. The display control program 135 may display additional information of each object together with the first image according to the determined displaying method.

Further, the memory 130 may include an internal memory (not shown) or an external memory (not shown). The internal memory may include at least one of a volatile memory, for example, a dynamic random access memory (DRAM), a static RAM (SRAM), or a synchronous DRAM (SDRAM), and a non-volatile memory, for example, a read only memory (ROM), a one time programmable ROM (OTPROM), a programmable ROM (PROM, an erasable PROM (EPROM), an electrically EPROM (EEPROM), a mask ROM, a flash ROM, a NAND flash memory, or a NOR flash memory. At this time, the internal memory may be a solid state drive (SSD) type. The external memory may include at least one of a compact flash (CF), a secure digital (SD), a micro-SD, a mini-SD, an extreme digital (xD), and a memory stick.

Further, the memory 130 may further include a kernel, middleware, or application programming interface (API). The kernel may control or manage system resources, for example, the bus 110, the processor 120, or the memory 130, used for executing operations or functions implemented in the remaining other programming modules, for example, the middleware, the API, or applications. Further, the kernel may provide an interface through which the middleware, API, or applications may access individual components of the electronic device 100 to control or manage the components.

The middleware may serve to mediate between the API or applications and the kernel so that they can communicate to exchange data with each other. Further, the middleware may perform load balancing for operation requests received from one or more applications by using a method of assigning priorities to the operation requests to first use system resources, for example, the bus 110, the processor 120, or the memory 130, of the electronic device 100. The API corresponds to an interface through which applications can control functions provided from the kernel or middleware, and may include at least one interface or function for performing a file control, window control, image processing, or text control.

The input unit 140 may transmit commands or data generated by a user's selection to the processor 120 or the memory 130 through the bus 110. For example, the input unit 140 may include a touch panel, a pen sensor, a key, an ultrasonic input device, or other pointer devices. The touch panel may recognize a touch input through at least one type from among, for example, a capacitive type, a resistive type, an infrared type, and an ultrasonic type. In the capacitive type, the touch screen panel can recognize a proximity touch as well as a direct touch. The proximity touch may be referred to as a non-contact touch or hovering. The touch panel may further include a tactile layer to provide a tactile reaction to the user. The touch panel may further include a controller.

The display unit 150 may display a picture, an image or data for the user. The display 150 may include the touch panel to simultaneously perform an input function and a display function. The touch panel may include a liquid crystal display (LCD) or an active matrix organic light emitting diode (AM-OLED), and may be implemented to be flexible, transparent, or wearable. The display unit 150 may include a hologram device, and the hologram device may show a stereoscopic image in the air by using interference of light. The display unit 150 may further include a control circuit for controlling the touch panel or the hologram device.

The communication unit 160 may connect communication between the electronic device 100 and one or more of the electronic devices 102 or 104, or a server 164. The communication unit 160 may support a short-range communication protocol, for example, Wi-Fi, Bluetooth (BT), near field communication (NFC), or network communication, for example, Internet, local area network (LAN), wide area network (WAN), telecommunication network, cellular network, satellite network, or plain old telephone service (POTS).

The image processing module 170 may perform a camera function, such as picture capture, video clip recording, or the like, by using the image sensor. The image processing module 170 may include a charged coupled device (CCD) or a complementary metal-oxide semiconductor (CMOS). Further, the image processing module 170 may change a hardware configuration, for example, by moving a lens or controlling a number and/or size of apertures according to a camera program executed by the electronic device 100. According to an embodiment of the present disclosure, the image processing module 170 may provide the processor 120 with collected images acquired by photographing objects. The image processing module 170 may include an image sensor for converting an optical signal to an electrical signal, an image processing unit for converting an analog image signal to a digital image signal, and a signal processing unit for image-processing an image signal output from the image processing unit to be displayed on the display unit 150.

Further, the image processing module 170 may include an actuator for moving a lens and a driver IC for driving the actuator. The image processing module 170 may move a lens through at least one of a voice coil motor type, a piezo type, and a liquid lens type, or may control a focal length through a physical property change due to electrical characteristics.

Figure 3:
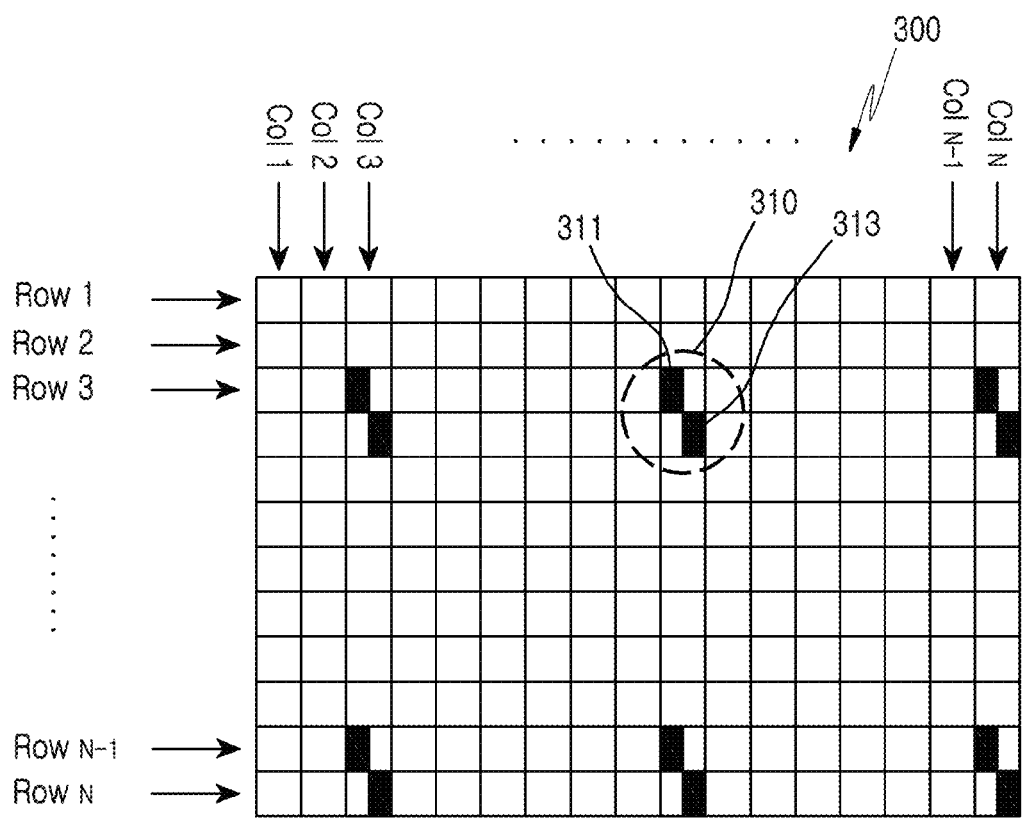
FIG. 3 is a view for describing a configuration of an image sensor according to an embodiment of the present disclosure.

FIG. 3 is a view for describing a configuration of an image sensor according to an embodiment of the present disclosure.

Referring to FIG. 3, the image sensor may include a plurality of phase difference detection pixels for detecting a distance between the electronic device 100 and an object. For example, the image sensor may include a plurality of phase difference pixels 310 arranged on an upper surface 300 of the image sensor at regular intervals, as illustrated in FIG. 3, or arranged in a particular area. According to an embodiment of the present disclosure, the phase difference pixels 310 may include a pair of pixels 311 having a hidden left half and a pixel 313 having a hidden right half. However, the phase difference pixels 310 are not limited thereto and can be implemented in various forms.

Figure 4A:
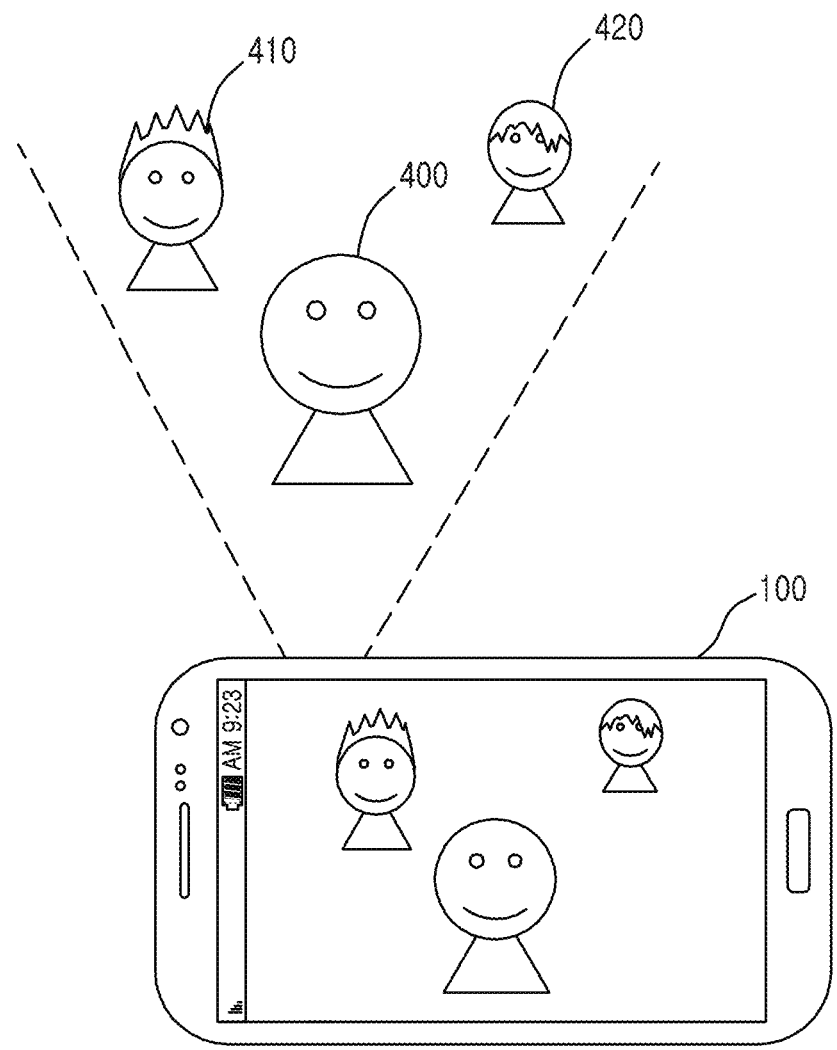
FIGS. 4A and 4B illustrate an example of a method in which an electronic device measures distances from objects by using an image sensor according to an embodiment of the present disclosure.
Figure 4B:
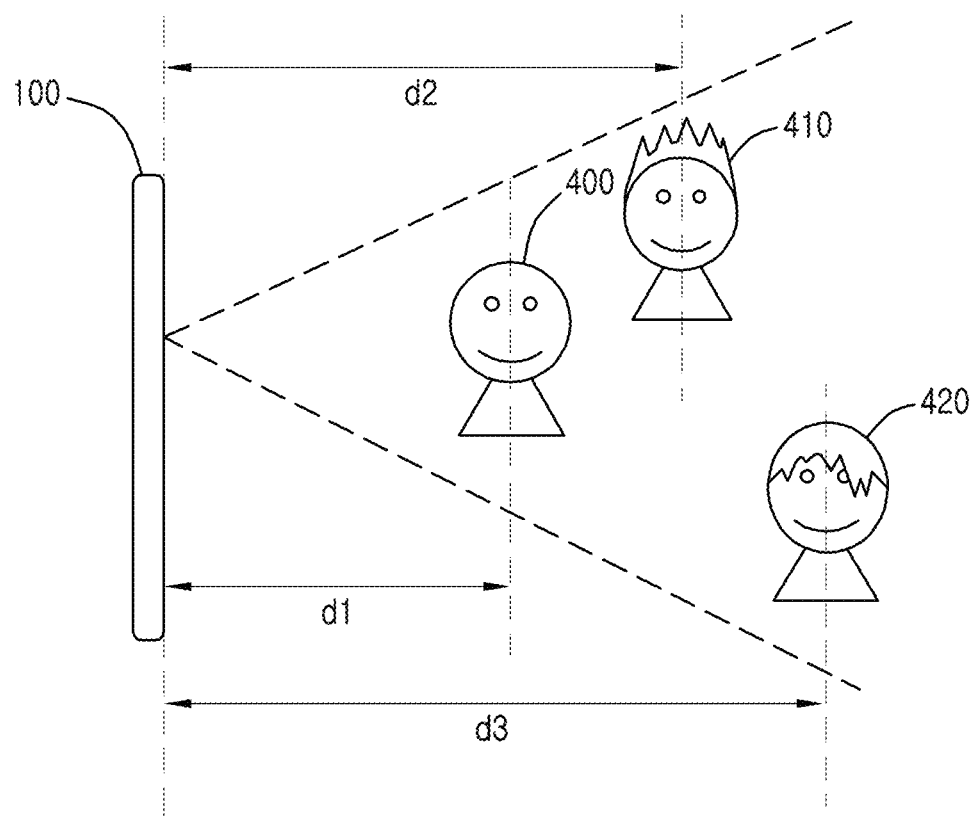

FIGS. 4A and 4B illustrate an example of a method in which an electronic device measures distances from objects by using an image sensor according to an embodiment of the present disclosure.

Referring to FIGS. 4A and 4B, when images of a plurality of objects 400, 410, and 420 are input into the image sensor, phase difference pixels located on an upper surface of the image sensor may measure each of distances d1, d2, and d3 that are respectively between each of the plurality of objects 400, 410, and 420 and the electronic device 100. Accordingly, the image sensor may distinguish among the object 400 closest to the electronic device 100, the next closest object 410 and the object 420 farthest from the electronic device 100.

Figure 5A:
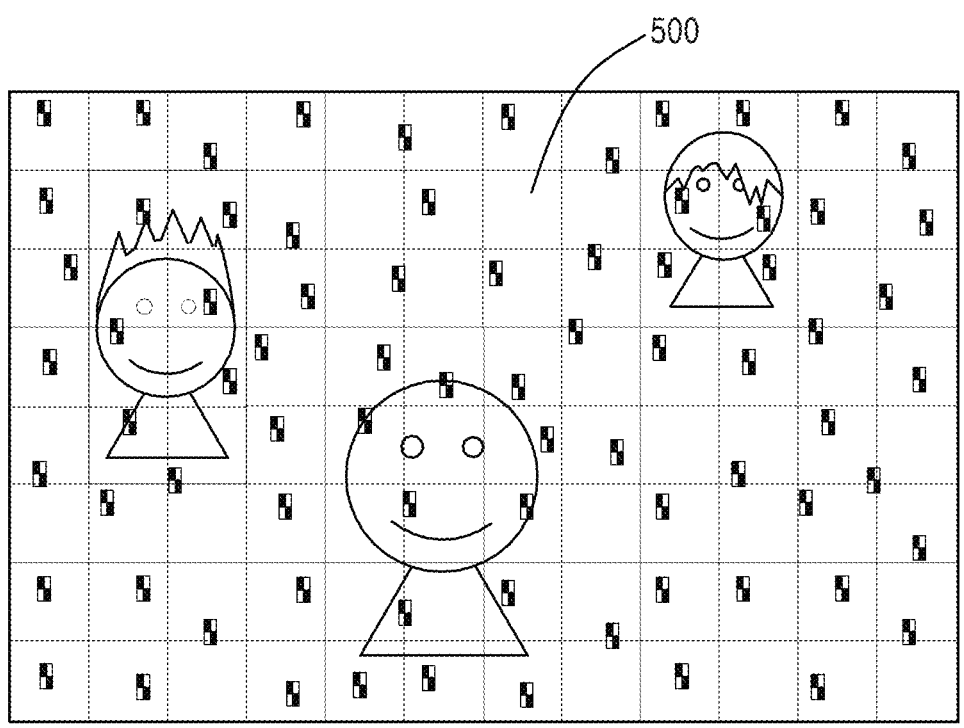
FIGS. 5A and 5B illustrate an example of a method in which an electronic device measures distances from objects by using an image sensor according to an embodiment of the present disclosure.
Figure 5B:
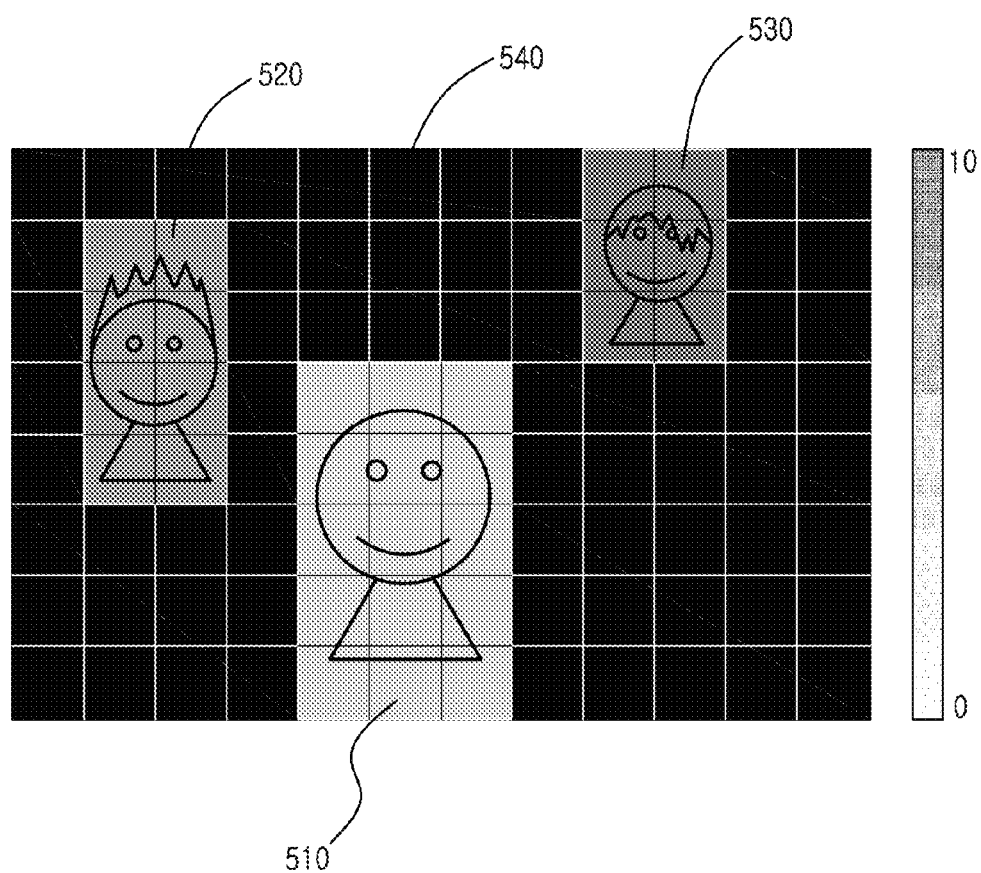

FIGS. 5A and 5B illustrate an example of a method in which an electronic device measures distances from objects by using an image sensor according to an embodiment of the present disclosure.

Referring to FIGS. 5A and 5B, according to an embodiment of the present disclosure, the image sensor may measure the distance between the object and the electronic device 100 by using a plurality of sub areas. For example, the image sensor may measure distances between the objects and the electronic device 100 by dividing an image input into the image sensor into one or more blocks 500 and comparing a phase difference value in a group of phase difference pixels located in one of the blocks 500 with a phase difference value in groups of phase difference pixels located in blocks 500 adjacent to the one of the blocks 500, as illustrated in FIG. 5A. In another example, the image sensor may acquire relative or absolute depth map information as illustrated in FIG. 5B based on distance information through the above described method. When it is assumed that a farthest distance from the electronic device 100 is 10 and a closest distance to the electronic device 100 is 0, the image sensor may divide a plurality of blocks as a block 510 corresponding to the object closest to the electronic device 100, a block 520 corresponding to the object next closest to the electronic device 100, a block 530 corresponding to the farthest object from the electronic device 100, and a block 540 of the background. Values generated by comparing phase differences of the blocks may be used as depth information.

Figure 14:
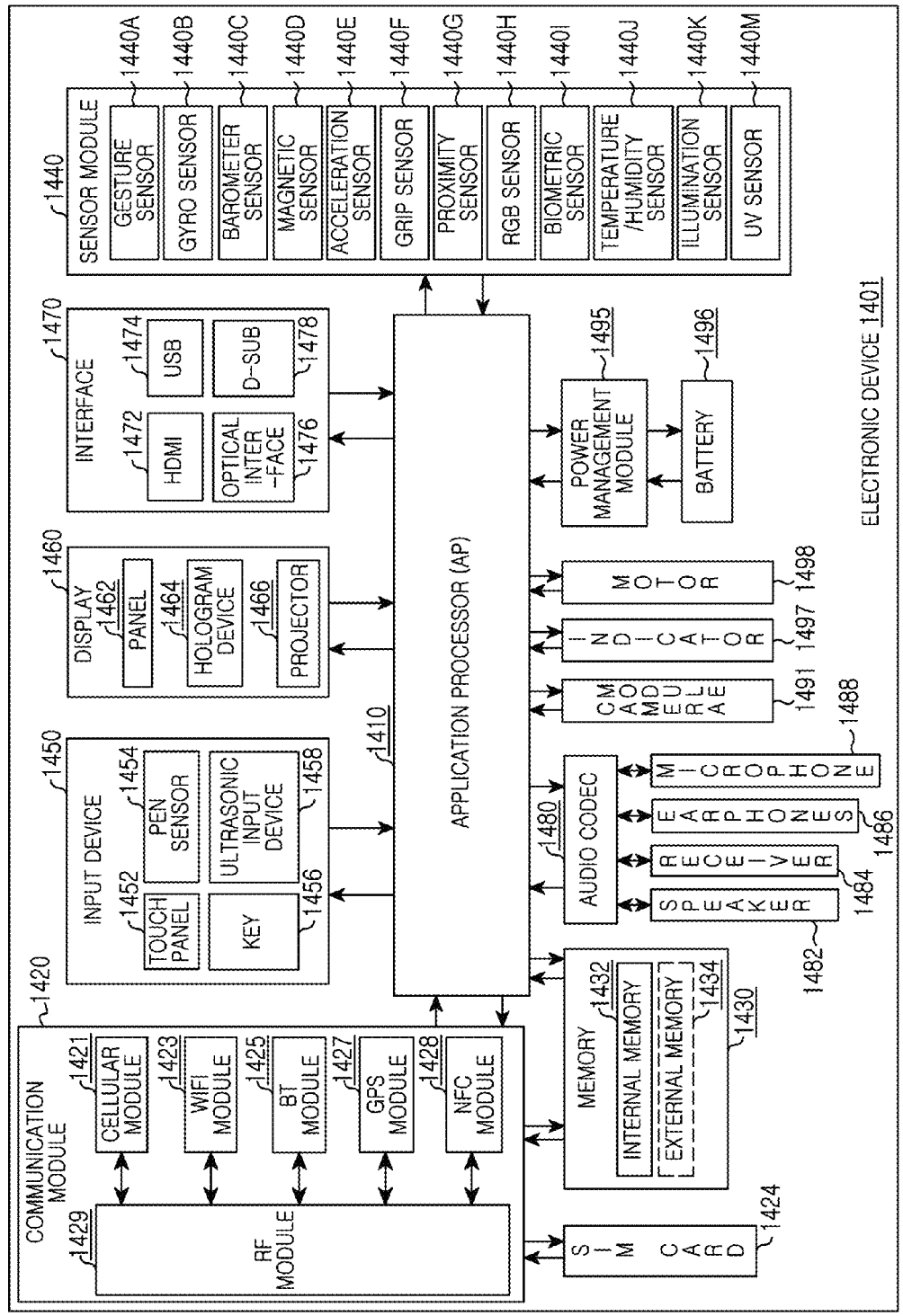
FIG. 14 is a block diagram illustrating an electronic device according to various embodiments of the present disclosure.

In addition, the electronic device 100 may further include a sensor module (see FIG. 14). The sensor module may include at least one of a gesture sensor, a gyro sensor, an atmospheric pressure sensor, a magnetic sensor, an acceleration sensor, a grip sensor, a proximity sensor, a biometric sensor, a body conduction sensor, a temperature sensor, an illumination sensor, and an ultra violet (UV) sensor. According to an embodiment of the present disclosure, the sensor module may measure a physical quantity or detect an operation state of the electronic device 100, and may convert the measured or detected information to an electronic signal. For example, the sensor module may include an E-nose sensor, an electromyography (EMG) sensor, an electroencephalogram (EEG) sensor, an electrocardiogram (ECG) sensor, or a fingerprint sensor.

Names of the components of the electronic device 100 according to various embodiments of the present disclosure may vary depending on a type of the electronic device 100. Further, the electronic device 100 may include one or more of the above described components, omit some of the components, or may further include additional other components according to the type of the electronic device 100.

Figure 2:
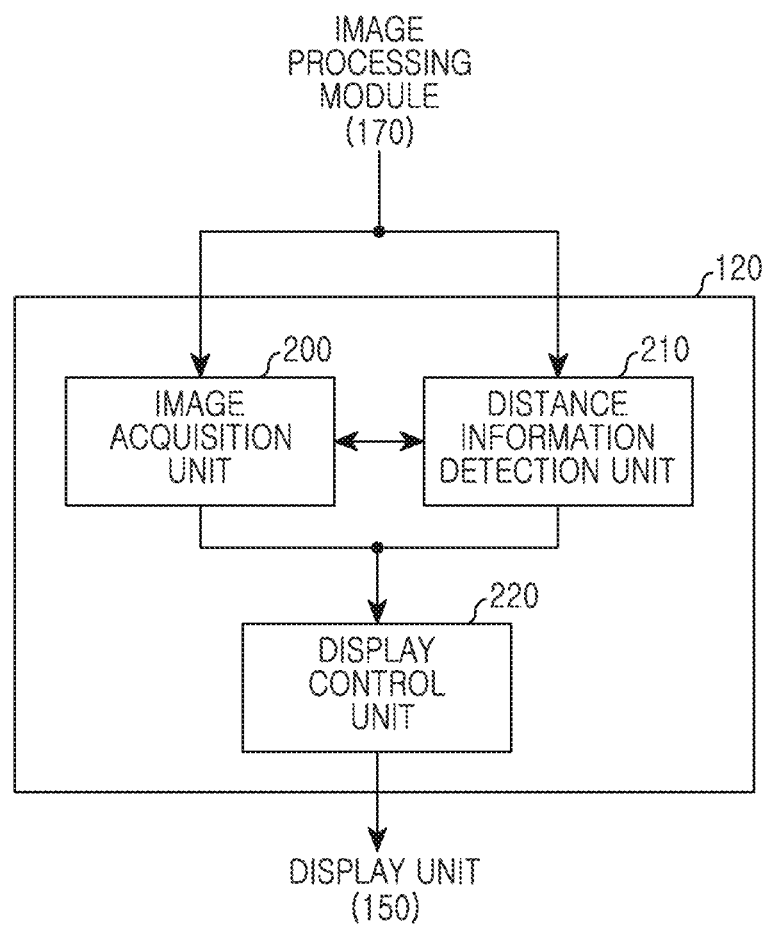
FIG. 2 is a block diagram of a processor according to an embodiment of the present disclosure.

FIG. 2 is a block diagram of the processor according to an embodiment of the present disclosure.

Referring to FIG. 2, the processor 120 may include an image acquisition unit 200, a distance information detection unit 210, and a display control unit 220.

According to an embodiment of the present disclosure, the image acquisition unit 200 may acquire a first image from the image sensor of the image processing module 170. Alternatively, the image acquisition unit 200 may receive a stored image from the memory 130 or an image from another electronic device. According to an embodiment of the present disclosure, the image acquisition unit 200 may include at least one of the image acquisition program 131 loaded in a volatile memory connected to the processor 120, hardware, for example, a SoC or a logic circuit, and firmware.

According to an embodiment of the present disclosure, the distance information detection unit 210 may detect a distance between each of a plurality of objects included in the first image and the electronic device. The distance information detection unit 210 may identify the distance between each of the plurality of objects included in the first image and the electronic device by using a plurality of phase difference detection pixels included in the image sensor. According to an embodiment of the present disclosure, the distance information detection unit 210 may include at least one of the distance information detection program 133 loaded in a volatile memory connected to the processor 120, hardware, for example, a SoC or a logic circuit, and firmware.

According to an embodiment of the present disclosure, the display control unit 220 may determine a method of displaying additional information of each of the objects based on the detected distance between each of the plurality of objects and the electronic device. The display control unit 220 may determine the method of displaying the additional information of each of the objects relatively or absolutely based on the distance between each of the plurality of objects and the electronic device 100. For example, when an object is farther from the electronic device, the display control unit 220 may display additional of the object to be gradually smaller. In another example, when an object is farther from the electronic device, the display control unit 220 may display additional of the object to be gradually paler. In still another example, when an object is farther from the electronic device, the display control unit 220 may display additional information of the object in a simple form. The additional information may be a focusing symbol displayed when an object is touched, but is not limited thereto. The additional information may also include all pieces of additional information which can be inserted into or displayed in a preview. The display control unit 220 may display additional information of each object together with the first image on the display unit 150 according to the determined displaying method. According to an embodiment of the present disclosure, the display control unit 220 may include at least one of the display control program 135 loaded in a volatile memory connected to the processor 120, hardware, for example, a SoC or a logic circuit, and firmware.

Although the components of the processor 120 have been described as separate modules with reference to FIG. 2, the components may be implemented as one module or a module of a combination thereof according to an embodiment of the present disclosure. Further, although the processor 120 and the image processing module 170 have been described as separate components with reference to FIG. 2, the image processing module 170 may include at least some of the components of the processor 120 in an embodiment of the present disclosure.

An electronic device, for example, the electronic device 100, according to various embodiments of the present disclosure may include an image sensor, and a processor for acquiring an image including one or more objects from the image sensor, detecting distances from the one or more objects, determining methods of displaying information related to the one or more objects, and displaying the information according to the displaying method.

According to various embodiments of the present disclosure, the processor may be configured to detect the distances based on values of phase difference detection pixels included in the image sensor.

According to various embodiments of the present disclosure, the information may include focusing symbols for focusing on the one or more objects.

According to various embodiments of the present disclosure, the processor may be configured to determine the display method based on a first attribute when the distance is within a first range, and determine the displaying method based on a second attribute when the distance is within a second range.

According to various embodiments of the present disclosure, the first attribute and the second attribute may include at least one of a size, color, and transparency corresponding to the information.

According to various embodiments of the present disclosure, the processor may be configured to determine sizes of the information related to the one or more objects based on the distances.

According to various embodiments of the present disclosure, the processor may be configured to determine colors of the information related to the one or more objects based on the distances.

According to various embodiments of the present disclosure, the processor may be configured to display the information on the image.

Figure 6:
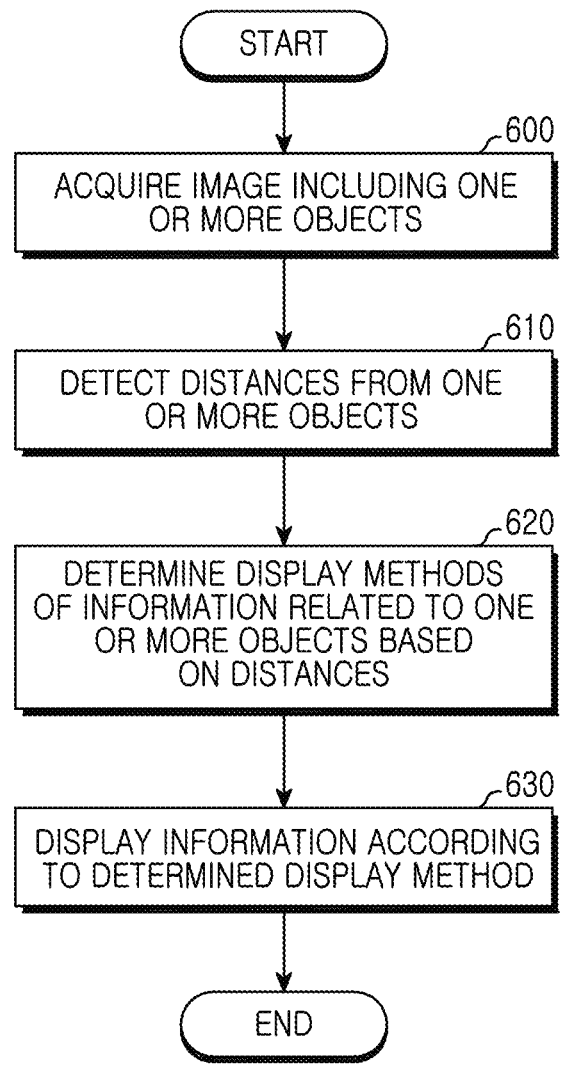
FIG. 6 illustrates a process in which an electronic device differently displays information related to objects according to distances from the objects according to an embodiment of the present disclosure.

FIG. 6 illustrates a process in which an electronic device displays information related to objects according to distances from the objects according to an embodiment of the present disclosure.

Referring to FIG. 6, an electronic device, for example, the electronic device 100, may acquire an image including one or more objects, for example, the object 400 or 410, in operation 600. For example, the electronic device may acquire an image from an image sensor, for example, the image processing module 170. The electronic device may display the image as a preview image or may store the image in a memory of the electronic device.

The electronic device may detect distances from the one or more objects included in the image in operation 610. According to an embodiment of the present disclosure, the electronic device may identify the distances between the electronic device and the one or more objects included in the image by using phase difference detection pixels included in the image sensor.

The electronic device may determine methods of displaying, for example, a size or color, additional information, for example, focusing symbols or object names, related to the one or more objects based on the distances between the electronic device and the one or more objects in operation 620. According to an embodiment of the present disclosure, the electronic device may determine methods of displaying information related to one or more objects relatively or absolutely based on the distances from the one or more objects. For example, when the object is farther from the electronic device, the electronic device may display information related to the object to be gradually smaller. In another example, when the object is farther from the electronic device, the electronic device may display information related to the object to be gradually more transparent or paler. The information related to the object may include a focusing symbol displayed when the object is touched.

The electronic device may display the information related to the one or more objects according to the determined displaying method in operation 630. For example, the electronic device may display the information related to the objects together with an image on the preview according to the determined displaying method, or may display the information related to the objects together with an image stored in the memory on the screen.

Figure 7:
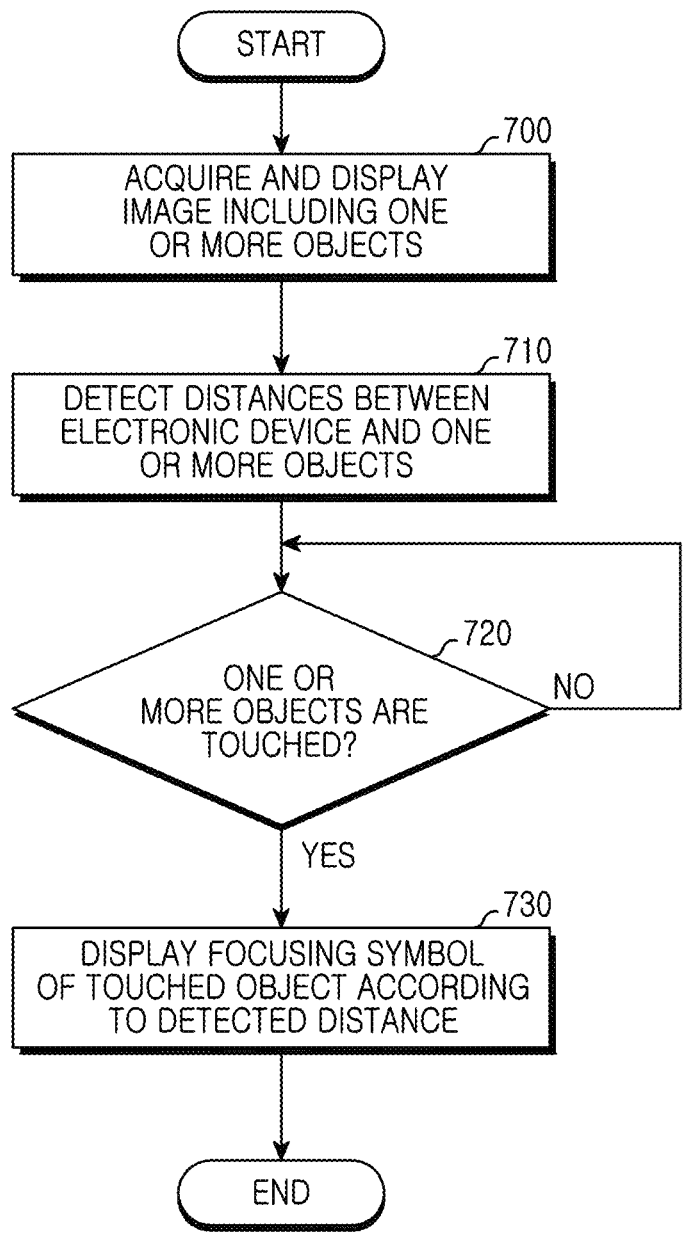
FIG. 7 illustrates a process in which an electronic device differently displays information related to objects according to distances from the objects according to an embodiment of the present disclosure.

FIG. 7 illustrates a process for displaying information related to objects according to distances between the objects and an electronic device according to an embodiment of the present disclosure.

Figure 8A:
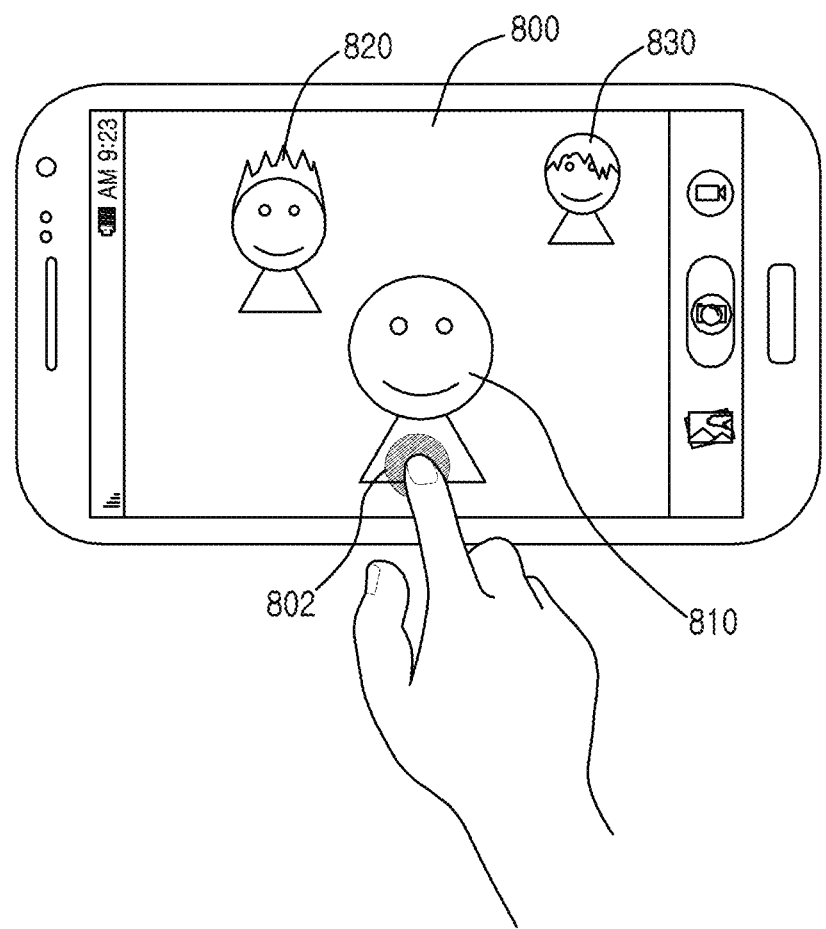
FIGS. 8A and 8B illustrate a screen configuration for differently displaying information related to objects according to distances from the objects according to an embodiment of the present disclosure.
Figure 8B:
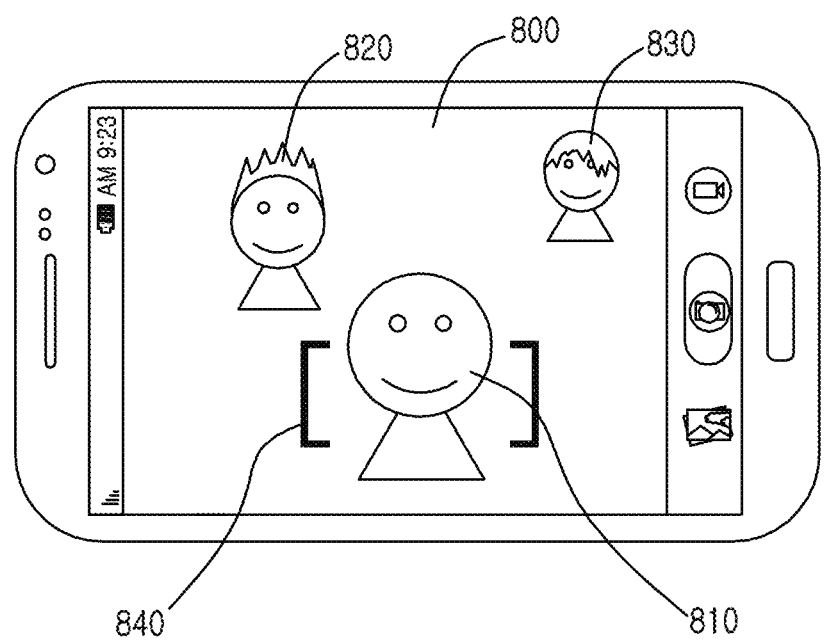

FIGS. 8A and 8B illustrate a screen configuration for differently displaying information related to objects according to distances from the objects according to an embodiment of the present disclosure.

Referring to FIGS. 7, 8A and 8B, an electronic device, for example, the electronic device 100, may acquire and display an image, including one or more objects, acquired from an image sensor in operation 700. For example, the electronic device may display an image corresponding to a preview image input into the image sensor on the screen.

The electronic device may detect a distance between the electronic device and each of the one or more objects included in the displayed image in operation 710. For example, the electronic device may identify the distances between the electronic device and the one or more objects included in the image by using a plurality of phase difference detection pixels included in the image sensor.

The electronic device may determine whether one of the one or more objects that are displayed is touched in operation 720. At this time, the touch on the one object may be a touch for focusing on the object.

When it is determined that one of the plurality of displayed objects is touched in operation 720, the electronic device may display a focusing symbol of the touched object according to the detected distance in operation 730. For example, referring to FIGS. 8A and 8B, when an input 802 for a first object 810 included in a preview image 800 is acquired, the electronic device may display a focusing symbol 840 according to a distance between the electronic device and the first object 810. For example, when it is determined that the first object 810 is closer to the electronic device in comparison with other objects 820 and 830, the electronic device may display the focusing symbol 840 for the first object 810 to be largest.

Figure 9A:
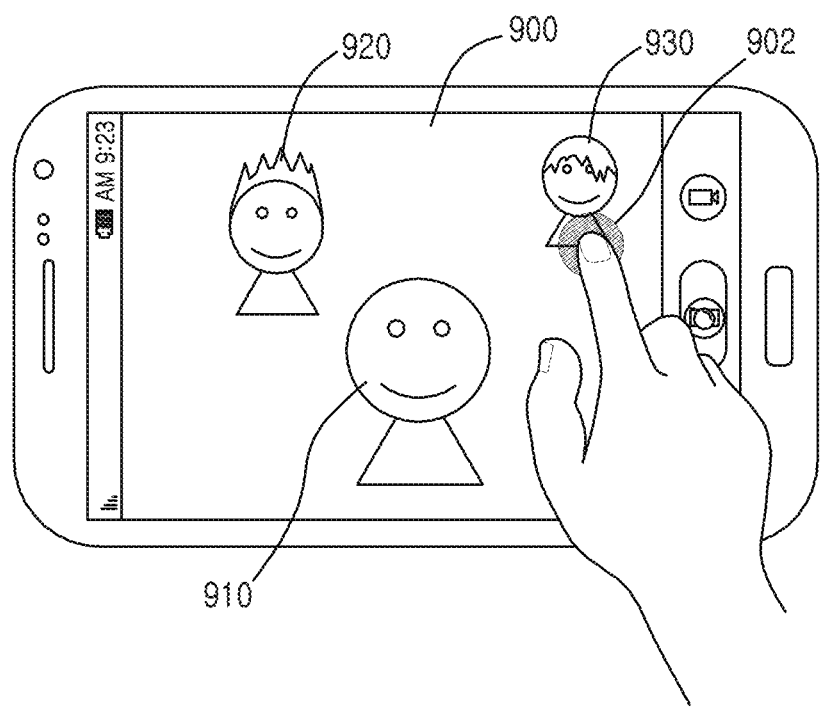
FIGS. 9A and 9B illustrate a screen configuration for differently displaying information related to objects according to distances from the objects according to an embodiment of the present disclosure.
Figure 9B:
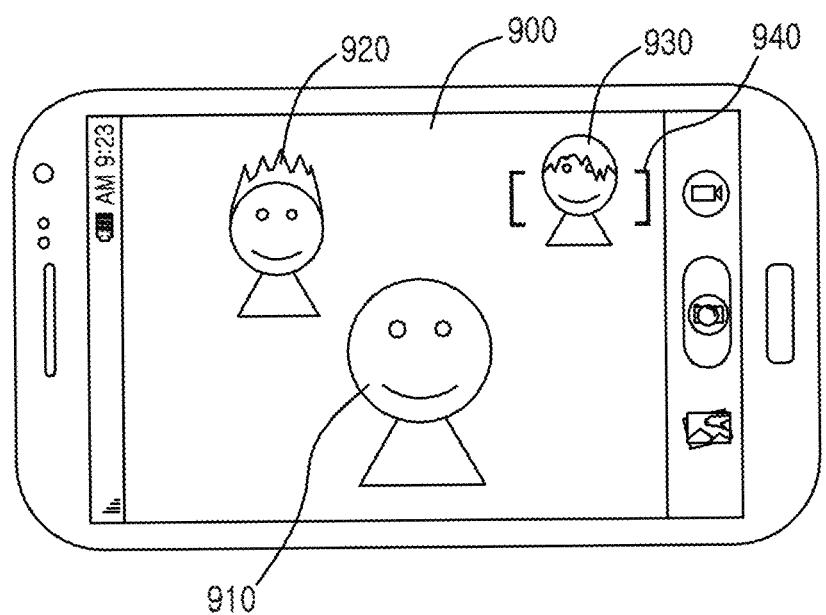

FIGS. 9A and 9B illustrate a screen configuration for differently displaying information related to objects according to distances from the objects according to an embodiment of the present disclosure.

Referring to FIGS. 9A and 9B, when an input 902 for a third object 930 included in a preview image 900 is acquired, the electronic device may display a focusing symbol 940 according to a distance between the electronic device and the third object 930. At this time, when it is determined that the third object 930 is farthest from the electronic device in comparison with other objects 910 and 920, the electronic device may display the focusing symbol 940 for the third object 930 to be smallest.

In still another example, the electronic device may display a focusing symbol for the selected object in the preview with various colors or various forms according to the detected distance. For example, the electronic device may display the focusing symbol to be gradually larger or smaller as the selected object is closer to the electronic device, and may display the focusing symbol to be darker or paler when the object is closer to the electronic device. Although only the focusing symbol displayed in the preview has been described with reference to FIGS. 7 to 9B, all pieces and/or any type of information which can be inserted into or displayed in the preview may be applied.

Figure 10:
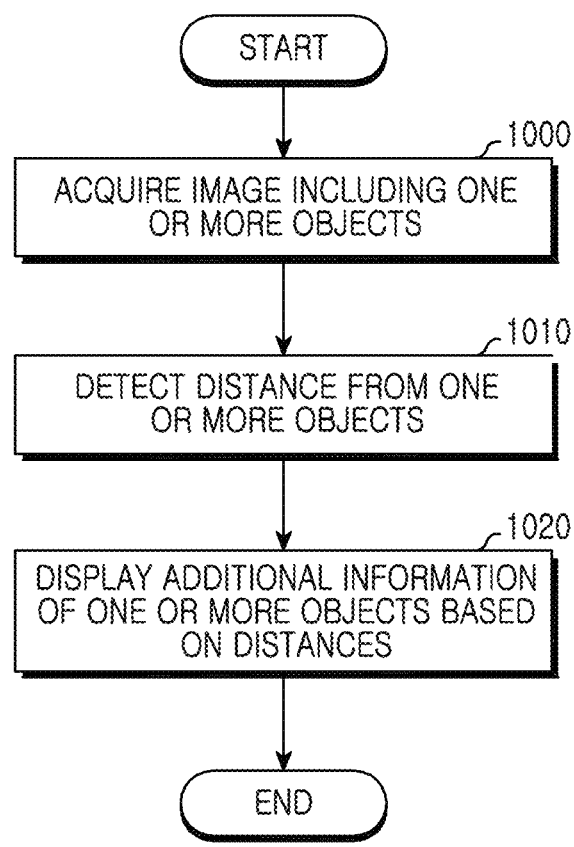
FIG. 10 illustrates a process in which an electronic device differently displays information related to objects according to distances from the objects according to an embodiment of the present disclosure.

FIG. 10 illustrates a process for displaying information related to objects according to distances between the objects and an electronic device according to an embodiment of the present disclosure.

Figure 11:
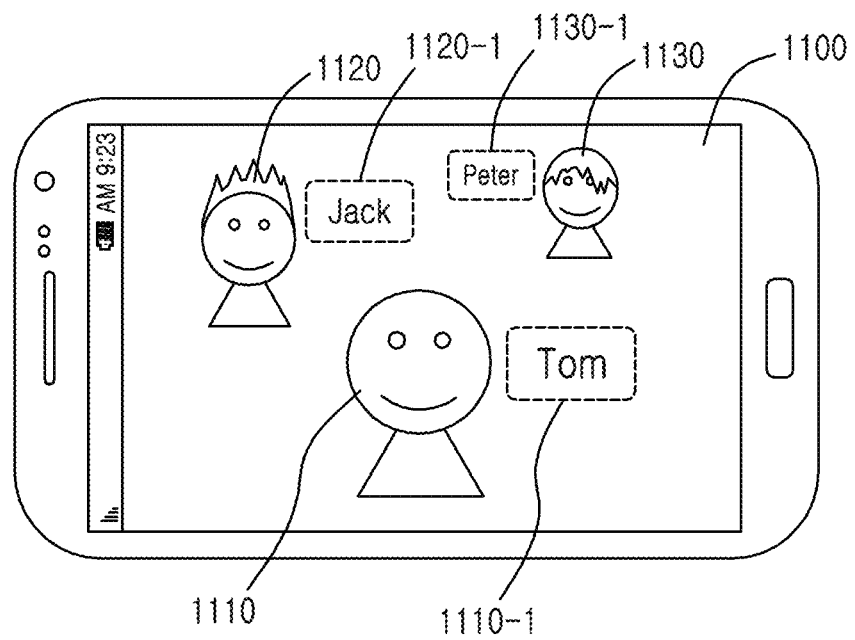
FIG. 11 illustrates a screen configuration for differently displaying information related to objects according to distances from the objects according to an embodiment of the present disclosure.

FIG. 11 illustrates a screen configuration for differently displaying information related to objects according to distances from the objects according to an embodiment of the present disclosure.

Referring to FIGS. 10 and 11, the electronic device may acquire an image including one or more objects in operation 1000. For example, the electronic device may acquire an image from an image sensor or an image from another electronic device.

The electronic device may detect distances from the one or more objects included in the image in operation 1010. For example, the electronic device may identify the distances from the one or more objects included in the image through distance information stored with the image. For example, the distance information may include distances between the electronic device, which may be an electronic device that captured and/or photographed the image, and one or more objects included in an image when the image is photographed. The distance information of the image may be stored with the image when the image is photographed or in a tag or watermarking scheme.

The electronic device may display additional information of and/or specified for the one or more objects according to the distances in operation 1020. For example, as shown in FIG. 11, the electronic device may display specified additional information 1110-1, 1120-1, and 1130-1 according to distances between the electronic device and one or more objects 1110, 1120, and 1130 included in an image 1100. The additional information may be include a name, age, nickname, address, phone number or symbol related to each object, but is not limited thereto. The additional information may be preset text or a picture. Alternatively, the additional information may include information which the electronic device receives from an external electronic device.

For example, when it is determined that the first object 1110 is closest to the electronic device, the electronic device may display additional information 1110-1 of the first object 1110 to be largest. Further, when it is determined that the third object 1130 is farthest from the electronic device, the electronic device may display additional information 1130-1 of the third object 1130 to be smallest. In such a way, the electronic device may display additional information to be gradually larger or gradually smaller according to a distance between the electronic device and an object. Further, the electronic device may display additional information with various colors or forms as well as various sizes.

Figure 12:
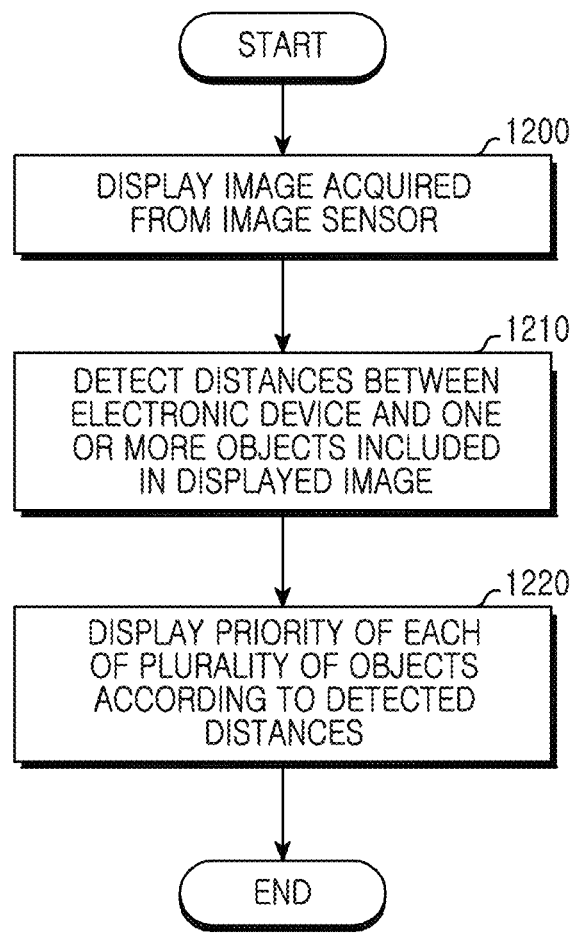
FIG. 12 illustrates a process in which an electronic device differently displays information related to objects according to distances from the objects according to an embodiment of the present disclosure.

FIG. 12 illustrates a process for displaying information related to objects according to distances between the objects and an electronic device according to an embodiment of the present disclosure.

Figure 13:
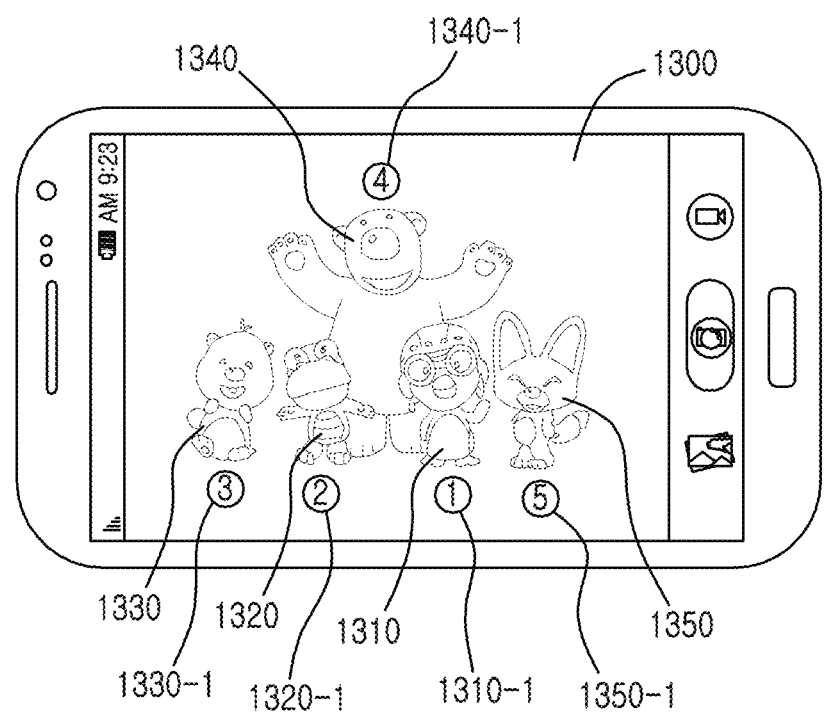
FIG. 13 illustrates a screen configuration for differently displaying information related to objects according to distances from the objects according to an embodiment of the present disclosure.

FIG. 13 illustrates a screen configuration for differently displaying information related to objects according to distances from the objects according to an embodiment of the present disclosure.

Referring to FIGS. 12 and 13, the electronic device, such as the electronic device 100, may display an image acquired from an image sensor in operation 1200. For example, the electronic device may display an image corresponding to a preview image input into the image sensor on the screen.

The electronic device may detect distances between the electronic device and one or more objects included in the displayed image in operation 1210. For example, the electronic device may identify the distances between the electronic device and the one or more objects included in the image by using phase difference detection pixels included in the image sensor.

The electronic device may display a priority of each of a plurality of objects according to the detected distance in operation 1220. At this time, the electronic device may assign the priority in an ascending order from an object closest to the electronic device in a preview image 1300 as illustrated in FIG. 13. For example, when it is determined that a first object 1310 is closest to the electronic device, the electronic device may display the first object 1310 with a priority number 1 1310-1. When it is determined that a second object 1320 is next closest to the electronic device, the electronic device may display the second object 1320 with a priority number 2 1320-1. In the same way, the electronic device may display priority number 3 1330-1, priority number 4 1340-1, and priority number 1350-1 respectively of third, fourth, and fifth objects 1330, 1340, and 1350. Accordingly, the user of the electronic device may identify which person is closest to the electronic device through the preview image 1300.

A method of displaying information by an electronic device, for example, the electronic device 100, according to various embodiments of the present disclosure may include an operation for acquiring an image including one or more objects, an operation for detecting distances between the electronic device and the one or more objects, an operation for determining methods of displaying information, for example, focusing symbols, related to the one or more objects based on the distances, and an operation for displaying the information according to the displaying method.

According to various embodiments of the present disclosure, the operation for acquiring the image may include an operation for acquiring the image from an image sensor functionally connected to the electronic device.

According to various embodiments of the present disclosure, the operation for detecting the distances may include an operation for detecting the distances based on values of phase difference detection pixels included in the image sensor.

According to various embodiments of the present disclosure, the method of displaying information by the electronic device may include an operation for acquiring depth map information based on the distances.

According to various embodiments of the present disclosure, the information may include focusing symbols for focusing on the one or more objects.

According to various embodiments of the present disclosure, the operation for determining the display method may include an operation for determining the display method based on a first attribute when the distance is with a first range, and determining the display method based on a second attribute when the distance is with a second range.

According to various embodiments of the present disclosure, the first attribute and the second attribute may include at least one of a size, color, and transparency corresponding to the information.

According to various embodiments of the present disclosure, the operation for determining the display method may include an operation for determining sizes of the information related to the one or more objects based on the distances.

According to various embodiments of the present disclosure, the operation for determining the display method may include an operation for determining colors of the information related to the one or more objects based on the distances.

According to various embodiments of the present disclosure, the operation for determining the display method may include an operation for determining priorities of the one or more objects based on the distances.

According to various embodiments of the present disclosure, the operation for displaying the information may include an operation for displaying the information on the image.

FIG. 14 is a block diagram of an electronic device according to various embodiments of the present disclosure. The electronic device according to an embodiment illustrated in FIG. 14 may include, for example, all or some of the electronic device 100 illustrated in FIG. 1.

Referring to FIG. 14, an electronic device 1401 may include one or more AP 1410, a communication module 1420, a SIM card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410 may control a plurality of hardware or software components connected to the AP 1410 by driving an operating system or an application program and perform processing of various pieces of data, including multimedia data and calculations. The AP 1410 may be implemented by, for example, an SoC. According to an embodiment of the present disclosure, the AP 1410 may further include a GPU.

The communication module 1420 may perform data transmission/reception in communication between the electronic device 1410, or, for example, the electronic device 100, and other electronic devices, for example, the electronic device 102 or the server 164, connected to electronic device 1410 through the network. According to an embodiment of the present disclosure, the communication module 1420 may include a cellular module 1421, a Wi-Fi module 1423, a BT module 1425, a global positioning system (GPS) module 1427, an NFC module 1428, and a radio frequency (RF) module 1429.

The cellular module 1421 may provide a voice call, a video call, a short message service (SMS), or an Internet service through a communication network, for example, long term evolution (LTE), LTE-advanced (LTE-A), code division multiple access (CDMA), wideband CDMA (WCDMA), universal mobile telecommunications system (UMTS), wireless broadband (WiBro), or global system for mobile communication (GSM). Furthermore, the cellular module 1421 may distinguish between and authenticate electronic devices within a communication network by using, for example, a SIM, for example, the SIM card 1424. According to an embodiment of the present disclosure, the cellular module 1421 may perform at least some functions which can be provided by the AP 1410. For example, the cellular module 1421 may perform at least some of the multimedia control functions.

According to an embodiment of the present disclosure, the cellular module 1421 may include a CP (not shown). Furthermore, the cellular module 1421 may be implemented by, for example, an SoC. Although the components such as the cellular module 1421, for example, a communication processor, the memory 1430, and the power management module 1495 are illustrated as components separate from the AP 1410 in FIG. 14, the AP 1410 may include at least some of the aforementioned components, for example, the cellular module 1421, according to an embodiment of the present disclosure.

According to an embodiment of the present disclosure, the AP 1410 or the cellular module 1421, for example, the CP may load commands or data received from at least one of a non-volatile memory and other components connected thereto in a volatile memory, and may process the loaded commands or data. Furthermore, the AP 1410 or the cellular module 1421 may store data received from or generated by at least one of other components in a non-volatile memory.

Each of the Wi-Fi module 1423, the BT module 1425, the GPS module 1427, and the NFC module 1428 may include, for example, a processor for processing data transmitted/received through the corresponding module. Although the cellular module 1421, the Wi-Fi module 1423, the BT module 1425, the GPS module 1427, and the NFC module 1428 are illustrated as separate blocks, at least some, for example, two or more, of the cellular module 1421 in FIG. 14, the Wi-Fi module 1423, the BT module 1425, the GPS module 1427, and the NFC module 1428 may be included in one IC or one IC package. For example, at least some, for example, the communication processor corresponding to the cellular module 1421 and the Wi-Fi processor corresponding to the Wi-Fi module 1423, of the processors corresponding to the cellular module 1421, the Wi-Fi module 1423, the BT module 1425, the GPS module 1427, and the NFC module 1428 may be implemented as one SoC.

The RF module 1429 may transmit/receive data, for example, an RF signal. Although not illustrated, the RF module 1429 may include, for example, a transceiver, a power amp module (PAM), a frequency filter, a low noise amplifier (LNA), or the like. Further, the RF module 1429 may further include a component for transmitting/receiving electronic waves over free air space in wireless communication, for example, a conductor, a conducting wire or the like. Although the cellular module 1421, the Wi-Fi module 1423, the BT module 1425, the GPS module 1427, and the NFC module 1428 share one RF module 1429 in FIG. 14, at least one of the cellular module 1421, the Wi-Fi module 1423, the BT module 1425, the GPS module 1427, and the NFC module 1428 may transmit/receive an RF signal through a separate RF module in an embodiment of the present disclosure.

The SIM card 1424 may be a card including a SIM, and may be inserted into a slot formed in a particular portion of the electronic device. The SIM card 1424 may include unique identification information, for example, an integrated circuit card identifier (ICCID), or subscriber information, for example, an international mobile subscriber identity (IMSI).

The memory 1430, for example, the memory 130, may include an internal memory 1432 or an external memory 1434. The internal memory 1432 may include at least one of a volatile memory, for example, a DRAM, an SRAM, an SDRAM, and the like, and a non-volatile memory, for example, an OTPROM, a PROM, an EPROM, an EEPROM, a mask ROM, a flash ROM, a NAND flash memory, a NOR flash memory, and the like.

According to an embodiment of the present disclosure, the internal memory 1432 may be an SSD. The external memory 1434 may further include a flash drive, for example, a CF, an SD, a Micro-SD, a Mini-SD, an xD, a memory stick, or the like. The external memory 1434 may be functionally connected with the electronic device 1401 through various interfaces. According to an embodiment of the present disclosure, the electronic device 1401 may further include a storage device (or storage medium) such as a hard drive.

The sensor module 1440 may measure a physical quantity or detect an operation state of the electronic device 1401, and may convert the measured or detected information to an electrical signal. The sensor module 1440 may include, for example, at least one of a gesture sensor 1440A, a gyro sensor 1440B, a barometer sensor 1440C, a magnetic sensor 1440D, an acceleration sensor 1440E, a grip sensor 1440F, a proximity sensor 1440G, a red, green, and blue (RGB) sensor 1440H, a biometric sensor 1440I, a temperature/humidity sensor 1440J, an illumination sensor 1440K, and a UV sensor 1440M. Additionally or alternatively, the sensor module 1440 may include other sensors (not shown), for example, an E-nose sensor, an EMG sensor, an EEG sensor, an ECG sensor, an infrared (IR) sensor, an iris sensor, or a fingerprint sensor. The sensor module 1440 may further include a control circuit for controlling one or more sensors included in the sensor module 1440.

The input device 1450 may include a touch panel 1452, a pen sensor 1454, a key 1456, or an ultrasonic input device 1458. The touch panel 1452 may recognize a touch input through, for example, at least one of a capacitive type, a resistive type, an infrared type, and an acoustic wave type. The touch panel 1452 may further include a control circuit. The capacitive touch panel may recognize physical contact or proximity. The touch panel 1452 may further include a tactile layer. In this case, the touch panel 1452 may provide a tactile reaction to the user.

The pen sensor 1454 may be implemented, for example, using a method identical or similar to a method of receiving a touch input of the user, or using a separate recognition sheet. The key 1456 may include, for example, a physical button, an optical key, or a keypad. The ultrasonic input device 1458 is a device which can detect an acoustic wave by a microphone, for example, a microphone 1488, of the electronic device 1401 through an input tool generating an ultrasonic signal to identify data and can perform wireless recognition. According to an embodiment of the present disclosure, the electronic device 1401 may receive a user input from an external device, for example, a computer or server, connected to the electronic device 1401 by using the communication module 1420.

The display 1460 may include a panel 1462, a hologram device 1464 or a projector 1466. The panel 1462 may be, for example, an LCD or an AM-OLED. The panel 1462 may be implemented to be, for example, flexible, transparent, or wearable. The panel 1462 may be configured as one module together with the touch panel 1452. The hologram device 1464 may show a stereoscopic image in the air by using interference of light. The projector 1466 may project light onto a screen to display an image. The screen may be located, for example, inside or outside the electronic device 1401. According to an embodiment of the present disclosure, the display 1460 may further include a control circuit (not shown) for controlling the panel 1462, the hologram device 1464, or the projector 1466.

The interface 1470 may include, for example, a high-definition multimedia interface (HDMI) 1472, a universal serial bus (USB) 1474, an optical interface 1476, or a D-subminiature (D-sub) 1478. The interface 1470 may be included in, for example, the communication unit 160 illustrated in FIG. 1. Additionally or alternatively, the interface 1470 may include, for example, a mobile high-definition Link (MHL) interface, an SD card/multimedia Card (MMC) interface, or an infrared data association (IrDA) standard interface.

The audio module 1480 may bilaterally convert a sound and an electrical signal. The audio module 1480 may process sound information input or output through, for example, a speaker 1482, a receiver 1484, earphones 1486, a microphone 1488 or the like.

The camera module 1491 is a device for capturing a still image or dynamic image, and may include one or more image sensors (not shown), for example, a front sensor or a rear sensor, a lens (not shown), an image signal processor (ISP), or a flash (not shown), for example, an LED or xenon lamp, according to an embodiment of the present disclosure.

The power management module 1495 may manage power of the electronic device 1401. Although not illustrated, the power management module 1495 may include, for example, a power management IC (PMIC), a charger IC, a battery, or a battery gauge. The PMIC may be mounted on, for example, an IC or a SoC semiconductor.

Charging methods may be classified into a wired charging method and a wireless charging method. The charger IC may charge a battery and prevent over voltage or over current from flowing from a charger. According to an embodiment of the present disclosure, the charger IC may include a charger IC for at least one of the wired charging method and the wireless charging method. The wireless charging method may include, for example, magnetic resonance scheme, a magnetic induction scheme, or an electromagnetic scheme, and an additional circuit for wireless charging, such as a coil loop circuit, a resonance circuit, a rectifier circuit, and the like may be added.

The battery gauge may measure, for example, a remaining quantity of the battery 1496, or a voltage, a current, or a temperature during the charging. The battery 1496 may store or generate electricity, and may supply power to the electronic device 1401 using the stored or generated electricity. The battery 1496 may include, for example, a rechargeable battery or a solar battery.

The indicator 1497 may display a specific status of the electronic device 1401 or the part, for example the AP 1410, of electronic device 1401, for example, a booting status, a message status, a charging status, and the like. The motor 1498 may convert an electrical signal to a mechanical vibration. Although not illustrated, the electronic device 1401 may include a processing unit, for example, a GPU, for supporting mobile TV. The processing device for supporting mobile TV may process, for example, media data according to a standard of digital multimedia broadcasting (DMB), digital video broadcasting (DVB), media flow or the like.

Each of the components of the electronic device according to the present disclosure may be implemented by one or more components and the name of the corresponding component may vary depending on a type of the electronic device. The electronic device 100, according to an embodiment of the present disclosure may include at least one of the above-described elements. Some of the above-described elements may be omitted from the electronic device 100, or the electronic device 100, may further include additional elements. Further, some of the components of the electronic device according to the present disclosure may be combined to be one entity, which can perform the same functions as those of the components before the combination.

The term "module" used in the present disclosure may refer to, for example, a unit including one or more combinations of hardware, software, and firmware. The "module" may be interchangeably used with the term unit, logic, logical block, component, circuit, or the like. The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific IC (ASIC) chip, a field-programmable gate array (FPGA), and a programmable-logic device for performing operations which has been known or are to be developed hereinafter.

According to various embodiments of the present disclosure, at least some of the devices, for example, modules or functions thereof, or the method, for example, operations, according to the present disclosure may be implemented by a command stored in a computer-readable storage medium in a programming module form. When the command is executed by one or more processors, for example, the processor 120, the one or more processors may execute a function corresponding to the command. The computer-readable storage medium may be, for example, the memory 130. At least a part of the programming module may be implemented, for example, executed, by, for example, the processor 120. At least some of the programming modules may include, for example, a module, a program, a routine, a set of instructions or a process for performing one or more functions.

The computer-readable recording medium includes magnetic media such as hard disks, floppy disks and magnetic tapes, optical recording media such as a compact disc ROM (CD-ROM) and a DVD, magneto-optical media, such as floptical disks, and hardware devices, such as a ROM, a RAM and a flash memory, which are specially configured to store and perform program commands, e.g., programming module. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a recording medium which stores commands is provided. When the commands are executed by one or more processors, one or more operations are performed by the one or more processors. The one or more operations may include an operation for acquiring an image including one or more objects, an operation for detecting distances between the one or more objects and the electronic device, an operation for determining display methods of information related to the one or more objects based on the distances, and an operation for displaying the information according to the determined display method.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
    acquiring an image including one or more objects;
    detecting distances between the one or more objects and the electronic device;
    receiving a touch input for selecting an object among the one or more objects; and
    displaying a symbol for focusing on the selected object in response to receiving the touch input,
    wherein a size of the symbol is determined according to a distance between the selected object and the electronic device among the detected distances.

2. The method of claim 1, wherein the acquiring of the image comprises acquiring the image from an image sensor functionally connected to the electronic device.

3. The method of claim 2, wherein the detecting of the distances comprises detecting the distances based on values of phase difference detection pixels included in the image sensor.

4. The method of claim 1, further comprising acquiring depth map information based on the detected distances.

5. The method of claim 1, further comprising:
    determining a display method for displaying the symbol based on a first attribute of the symbol when the detected distance is within a first range; and
    determining the display method for displaying the symbol based on a second attribute of the symbol when the detected distance is within a second range.

6. The method of claim 5, wherein the first attribute and the second attribute include at least one of a size, color, or transparency of the symbol.

7. The method of claim 1, further comprising determining a color of the symbol according to a distance between the selected object and the electronic device among the detected distances.

8. The method of claim 1, further comprising determining priorities of the one or more objects according to the detected distances.

9. The method of claim 1, wherein the displaying of the symbol comprises displaying the symbol on the image.

10. An apparatus comprising:
    a memory configured to store instructions therein;
    an image sensor; and
    at least one processor configured, upon execution of the instructions, to:
        acquire an image including one or more objects from the image sensor,
        detect distances between the one or more objects and the electronic device,
        display a symbol for focusing on the selected object in response to receiving the touch input; and
    a touch panel configured to:
        receive a touch input for selecting an object among the one or more objects,
    wherein a size of the symbol is determined according to a distance between the selected object and the electronic device among the detected distances.

11. The apparatus of claim 10, wherein the at least one processor is further configured to detect the distances based on values of phase difference detection pixels included in the image sensor.

12. The apparatus of claim 10, wherein the at least one processor is further configured to:
    determine a display method for displaying the symbol based on a first attribute of the symbol when the detected distance is within a first range, and
    determine the display method for displaying the symbol based on a second attribute of the symbol when the detected distance is within a second range.

13. The apparatus of claim 12, wherein the first attribute and the second attribute include at least one of a size, color, or transparency of the symbol.

14. The apparatus of claim 10, wherein the at least one processor is further configured to determine colors of the symbol according to a distance between the selected object and the electronic device among the detected distances.

* * * * *